United States Patent [19]

Kubota

[11] Patent Number: 4,568,241
[45] Date of Patent: Feb. 4, 1986

[54] HYDRAULIC MACHINES
[75] Inventor: Yuji Kubota, Tokyo, Japan
[73] Assignee: Kabushiki Kaisha Toshiba, Kawasaki, Japan
[21] Appl. No.: 626,142
[22] Filed: Jun. 29, 1984
[30] Foreign Application Priority Data
 Jul. 15, 1983 [JP] Japan .................. 58-129197
[51] Int. Cl.$^4$ ............................ F01D 24/04
[52] U.S. Cl. .................. 415/119; 415/104; 416/500
[58] Field of Search ............ 415/119, 104, 500, 113, 415/204; 416/500

[56] References Cited
U.S. PATENT DOCUMENTS

| | | | |
|---|---|---|---|
| 3,160,108 | 12/1964 | Sence | 415/106 |
| 3,228,656 | 1/1966 | Kyogoku | 415/500 |
| 3,764,236 | 10/1973 | Carter | 415/104 |
| 3,975,911 | 8/1976 | Morgulis et al. | 415/146 |
| 4,115,030 | 9/1978 | Inagaki et al. | 415/119 |
| 4,152,095 | 5/1979 | McKelvey | 415/119 |

FOREIGN PATENT DOCUMENTS

| | | | |
|---|---|---|---|
| 134978 | 4/1979 | Denmark | 415/104 |
| 57-163164 | 7/1982 | Japan . | |
| 896482 | 5/1962 | United Kingdom | 415/113 |

Primary Examiner—Robert E. Garrett
Assistant Examiner—John Kwon
Attorney, Agent, or Firm—Schwartz, Jeffery, Schwaab, Mack, Blumenthal & Evans

[57] ABSTRACT

In a hydraulic machine including a vertical shaft, a runner secured to an end of the vertical shaft, a runner chamber defined by an upper cover and a lower cover to encase the runner to be rotatable, and a spiral casing provided around the runner chamber, a vibrating member is provided in a portion of the runner chamber to be vibrated in resonance with the runner when the runner is operated in the runner chamber.

2 Claims, 8 Drawing Figures

HYDRAULIC MACHINES

BACKGROUND OF THE INVENTION

This invention relates to hydraulic machines such as Francis type pump-turbines, centrifugal pumps and the like, and more particularly of a type in which the strength for resisting vibration of the runner can be substantially improved, so that high-speed and high pressure-head operation of the machine is made possible.

An ordinary Francis type hydraulic turbine generally comprises a turbine shaft and a runner secured to one end of the turbine shaft, the runner being encased in a runner chamber which is defined between an upper cover and a lower cover. A plurality of guide vanes are provided around the runner chamber on the outside thereof, and a spiral casing is provided on the outside of the guide vanes. When the turbine is to be operated, water in the spiral casing is supplied through the guide vanes into the runner chamber and the reaction force created at this time is utilized for rotating the runner.

In this case, it has been known that each time when a runner blade passes the proximity of the guide vanes which are held stationary, there is a tendency of creating pulsation in water pressure, caused by mutual actions between these members. The pulsation in water pressure is transmitted to the runner surface to vibrate the same in the vertical direction.

In conventional hydraulic turbines which are operated under comparatively low heads and hence at comparatively low speeds, the pulsation in water pressure has a comparatively low energy, so that the influence thereof on the vibration resisting strength of the runner is negligible. However, in a recent hydraulic turbine operating under a high water head and at a high rotating speed, the energy of the water pulsation tends to increase such that the effects thereof on the vibration resisting strength of the runner can not be negligible. Particularly, when the pulsation frequency coincides with the natural vibration frequency of the runner, the operation of the hydraulic turbine becomes dangerous.

SUMMARY OF THE INVENTION

An object of the present invention is to provide a hydraulic machine wherein the above-described difficulties of conventional machines can be substantially eliminated.

Another object of the invention is to provide a hydraulic machine wherein the coincidence of the pulsation frequency with the natural vibration frequency of the runner can be prevented, and the reliability of the operation of the hydraulic machine can be substantially improved.

According to the present invention, there is provided a hydraulic machine comprising a vertical shaft, a runner secured to an end of the vertical shaft a runner chamber defined by an upper cover and a lower cover to encase the runner rotatably, characterized in that a vibrating member is provided in a portion of the runner chamber so as to be vibrated in resonance with the runner when the runner is operated in the runner chamber.

DESCRIPTION OF THE PREFERRED EMBODIMENTS

Before entering detailed description of this invention, a typical construction of a conventional hydraulic machine and the principles thereof will firstly be described with reference to FIGS. 1 and 2.

Figure 1:
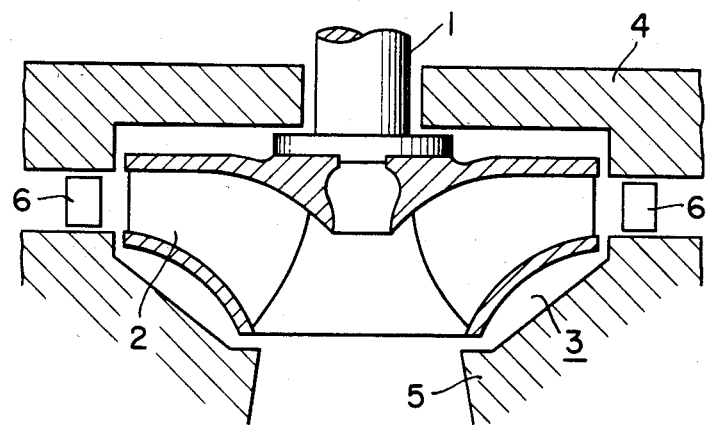
FIG. 1 is a longitudinal sectional view of a portion of a conventional Francis type hydraulic turbine.
Figure 2:
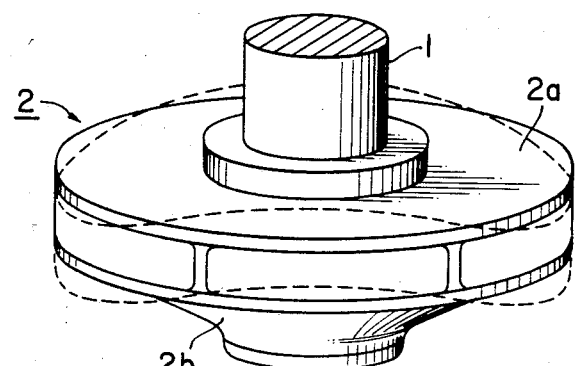
FIG. 2 is a perspective view of a runner used in the hydraulic turbine shown in FIG. 1.

A hydraulic machine, for instance, a Francis type hydraulic turbine is constructed as shown in FIG. 1 wherein a runner 2 provided at an end of a turbine shaft 1 is rotated in a runner chamber 3 which is defined by an upper cover 4 and a lower cover 5. A plurality of guide vanes 6 are provided between a spiral casing (not shown) and the runner chamber 3. When the turbine is operated, water in the spiral casing is supplied through the guide vanes 6 into the runner chamber 3.

In this case, however, it is well known that pulsation in water pressure occurs each time a runner blade is brought into the proximity of the guide vanes as described hereinbefore. The pulsation in water pressure tends to vibrate the crown $2a$ and the band portion $2b$ of the runner 2 in directions perpendicular to the surfaces of these portions, for instance, as shown by dotted lines in FIG. 2. Such a tendency becomes significant in a recent hydraulic turbine that operates under a high pressure head and at a high speed, particularly when the pulsation frequency coincides with the natural vibration frequency of the runner.

Figure 3A:
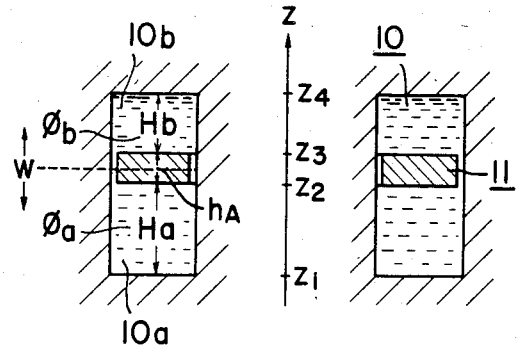
FIGS. 3A and 3B are diagrammatic representations showing the conventional hydraulic turbine.
Figure 3B:
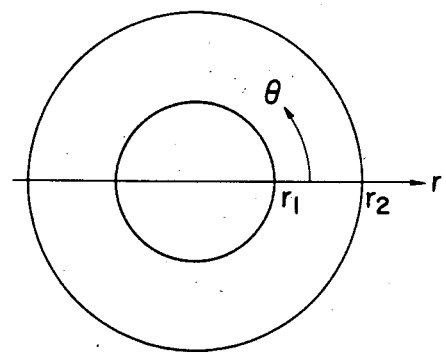
Figure 4:
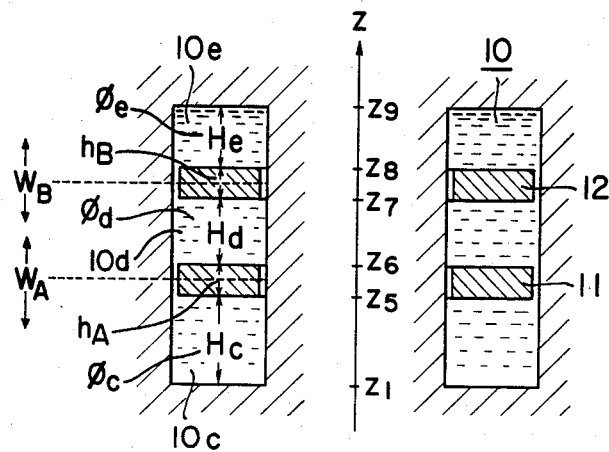
FIG. 4 is a diagrammatic representation showing a hydraulic turbine of this invention.

The principle of the present invention will now be described with reference to FIGS. 3A, 3B and 4. In FIG. 3A showing an ordinary Francis type hydraulic turbine in a model form, an annular flow passage 10 corresponding to the runner chamber 3 is filled with water and an annular disc 11 corresponding to the runner 2 is placed in the flow passage 10. On the other hand, in FIG. 4 showing a model of a hydraulic turbine according to this invention, wherein similar members are designated by similar reference numerals used in FIGS. 1 through 3B, an annular disc 11 and a vibrating member 12 are placed in the annular flow passage 10 representing the runner chamber filled with water, with the vibrating member 12 placed above the annular disc 11. In these models, it is assumed that water does not flow into or out of the flow passage 10 and portions $10a$ and $10b$ in FIG. 3A or portions $10c$, $10d$ and $10e$ in FIG. 4 of the flow passage 10 are all completely separated from each other, and that the water is a potential fluid having no viscosity and incompressible.

In a case where it is assumed that the width of the annular flow passage 10 measured in the radial direction is much smaller than the radius of the flow passage 10 measured from the central axis, and that a coordinate r of the cylindrical coordinate system ($4$, $\theta$ and z), representing an arbitrary point in the flow passage 10 is made substantially equal to the average value $r_0$ of the width which is given as follows (see FIG. 3B).

$$r \simeq r_0 = (r_1 + r_2)/2$$

Furthermore, it is assumed that the vibrations of the water in the flow passage 10, and the annular disc 11 and the vibration member 12 do not vary in the radial direction. Thus, the Laplace's equation and a vibration equation as follows can be applied to the water and the annular disc 11 in the flow passage 10 in FIGS. 3A and 3B, respectively.

$$\frac{1}{r_0^2} \frac{\partial^2 \phi}{\partial \theta^2} + \frac{\partial^2 \phi}{\partial z^2} = 0 \quad (1)$$

$$\rho h \frac{\partial^2 w}{\partial t^2} + \frac{k^2}{r_0^4} \frac{\partial^4 w}{\partial \theta^4} = P_L - P_U \quad (2)$$

$$\text{wherein } k^2 = \frac{Eh^3}{12(1 - \sigma^2)} \quad (3)$$

$\phi$: velocity potential of the water,
w: vertical displacement of the annular disc 11,
E: Young's modulus of the disc 11,
h: thickness of the disc 11,
$\rho$: density of the disc 11,
$\sigma$: Poisson's ratio of the disc 11,
$P_L$: water pressure applied to the lower surface of the disc 11,
$P_U$: water pressure applied to the upper surface of the disc 11, and
t: time.

When the variation of the pressure is small, the relation between the water pressure p and the velocity potential $\phi$ is given by the following equation:

$$p = -\rho_0 \frac{\partial \phi}{\partial t} \quad (4)$$

wherein $\rho_0$ is the density of water.

In the model shown in FIGS. 3A and 3B, assuming that $w_A$ represents a vertical displacement of the annular disc 11, $\phi_a$ and $\phi_b$ represent velocity potentials of water in the passage portions 10a and 10b, the boundary conditions to be satisfied by the velocity potentials $\phi_a$ and $\phi_b$ are expressed as follows.

$$\left. \frac{\partial \phi_a}{\partial z} \right|_{z=z_1} = \left. \frac{\partial \phi_b}{\partial z} \right|_{z=z_4} = 0$$

$$\left. \frac{\partial \phi_a}{\partial z} \right|_{z=z_2} = \left. \frac{\partial \phi_b}{\partial z} \right|_{z=z_3} = \frac{\partial w_A}{\partial t} \quad (5)$$

In a case where the annular disc 11 is vibrating in accordance with an equation, $$w_A = \sum_{n=1}^{\infty} A_n \cos n\theta e^{j\omega t} \quad (6)$$

wherein
n: number of node-diameters,
$A_n$: amplitude of the vibration,
$\omega$: angular frequency, and
j: imaginary unit,
the ratio of the natural vibration frequency in water of the disc 11 to that in air can be calculated from equations (1) through (6) as follows.

$$\left. \begin{array}{l} \left(\dfrac{f_{water}}{f_{A\ air}}\right)^2 = \dfrac{1}{1+M} \\ \\ M = \dfrac{\rho_0 r_0}{n \rho_A h_A} \left[ \coth\left(\dfrac{nHa}{r_0}\right) + \coth\left(\dfrac{nHb}{r_0}\right) \right] \end{array} \right\} \quad (7)$$

wherein,
$f_{water}$: natural vibration frequency of the annular disc 11 placed in water,
$f_{A\ air}$: natural vibration frequency of the annular disc 11 placed in air,
$\rho_A$: density of the annular disc 11,
$h_A$: thickness of the disc 11,
Ha: depth of the passage portion 10a, and
Hb: depth of the passage portion 10b.

On the other hand, in the case of the model shown in FIG. 4, assuming that $w_A$ and $w_B$ represent the displacements of the annular disc 11 and the vibration member 12, respectively, while $\phi_c$, $\phi_d$ and $\phi_e$ represent the velocity potentials of the water in the flow-passage portions 10c, 10d and 10e, respectively, the boundary conditions for $\phi_c$, $\phi_d$, $\phi_e$ can be determined as follows.

$$\left. \begin{array}{l} \left. \dfrac{\partial \phi_c}{\partial z} \right|_{z=z_1} = \left. \dfrac{\partial \phi_e}{\partial z} \right|_{z=z_9} = 0 \\ \\ \left. \dfrac{\partial \phi_c}{\partial z} \right|_{z=z_5} = \left. \dfrac{\partial \phi_d}{\partial z} \right|_{z=z_6} = \dfrac{\partial w_A}{\partial t} \\ \\ \left. \dfrac{\partial \phi_d}{\partial z} \right|_{z=z_7} = \left. \dfrac{\partial \phi_e}{\partial z} \right|_{z=z_8} = \dfrac{\partial w_B}{\partial t} \end{array} \right\} \quad (8)$$

Thus, when the annular disc 11 and the vibration member 12 vibrate in accordance with the following equations:

$$w_A = \sum_{n=1}^{\infty} A_n \cos n\theta e^{j\omega t} \quad (9)$$

$$w_B = \sum_{m=1}^{\infty} B_m \cos m\theta e^{j\omega t} \quad (10)$$

The ratio between the natural vibration frequencies of the annular disc 11 when the disc 11 is placed in air and in water is expressed as follows.

$$\left(\frac{f_{water}}{f_{A,air}}\right)^2 = \frac{Q \pm \sqrt{Q^2 - 4\alpha p}}{2p}$$

$$p = \left[\frac{\rho_0 r_0}{n\rho_A h_A}\left\{\coth\left(\frac{nHc}{r_0}\right) + \coth\left(\frac{nHd}{r_0}\right)\right\} + 1\right] + \left[\frac{\rho_0 r_0}{n\rho_0 h_B}\left\{\coth\left(\frac{nHd}{r_0}\right) + \coth\left(\frac{nHe}{r_0}\right)\right\} + 1\right] -$$

$$\frac{1}{\rho_A \rho_B h_A h_B}\left\{\frac{\rho_0 r_0}{n \sinh\left(\frac{nHd}{r_0}\right)}\right\}^2 \quad (11)$$

$$Q = \alpha^2\left[\frac{\rho_0 r_0}{n\rho_A h_A}\left\{\coth\left(\frac{nHc}{r_0}\right) + \coth\left(\frac{nHd}{r_0}\right)\right\} + 1\right] + \left[\frac{\rho_0 r_0}{n\rho_B h_B}\left\{\coth\left(\frac{nHd}{r_0}\right) + \coth\left(\frac{nHe}{r_0}\right)\right\} + 1\right]$$

$$\alpha = \left(\frac{f_{B\,air}}{f_{A\,air}}\right)^2$$

wherein
- $\rho_B$: density of the vibration member 12,
- $h_B$: thickness of the member 12,
- Hc: depth of the flow passage portion 10c,
- Hd: depth of the flow passage portion 10d,
- He: depth of the flow passage portion 10e,
- $f_{water}$: natural vibration frequency of the annular disc 11 placed in water,
- $f_{A\,air}$: natural vibration frequency of the annular disc 11 placed in air,
- $f_{B\,air}$: natural vibration frequency of the vibration member 12 placed in air.

As is apparent from equation (11) corresponding to the model shown in FIG. 4, two values of the natural vibration frequency $f_{water}$ are obtained for each node-diameter mode.

In a specific example of the conventional model shown in FIG. 3, wherein $h_A/r_0=0.05$, $Ha/r_0=0.1$, $Hb/r_0=0.05$ and $\rho_A/\rho_0=7.86$, the ratio $f_{water}/f_{Aair}$ determined from the equation (7) for the case of n=2 (two node-diameter mode) is found to be $$\frac{f_{water}}{f_{Aair}} = 0.222$$

Figure 5:
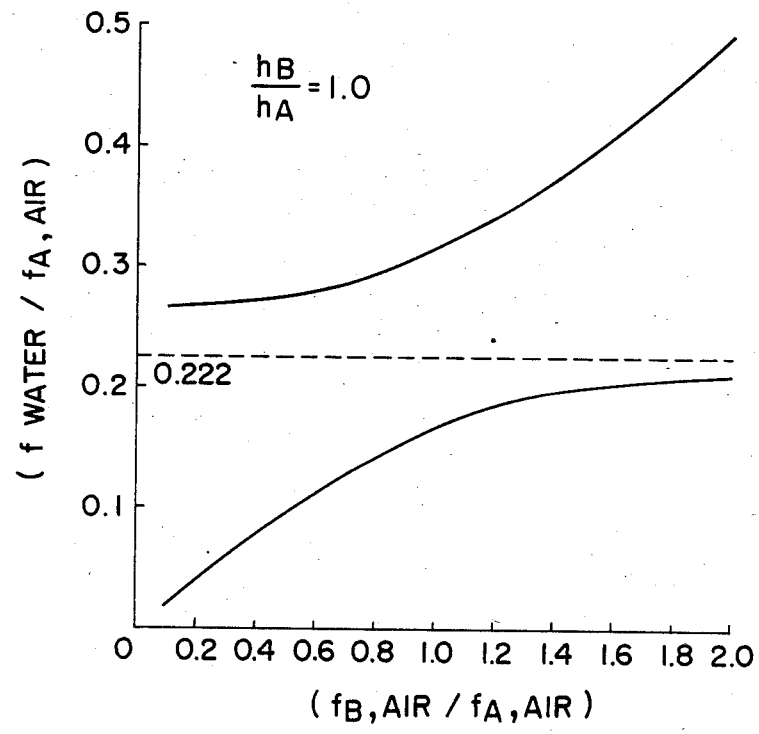
FIGS. 5 and 6 are graphs showing the effects of the vibration member on the natural vibration frequency of the runner, which are calculated for the mode shown in FIG. 4.
Figure 6:
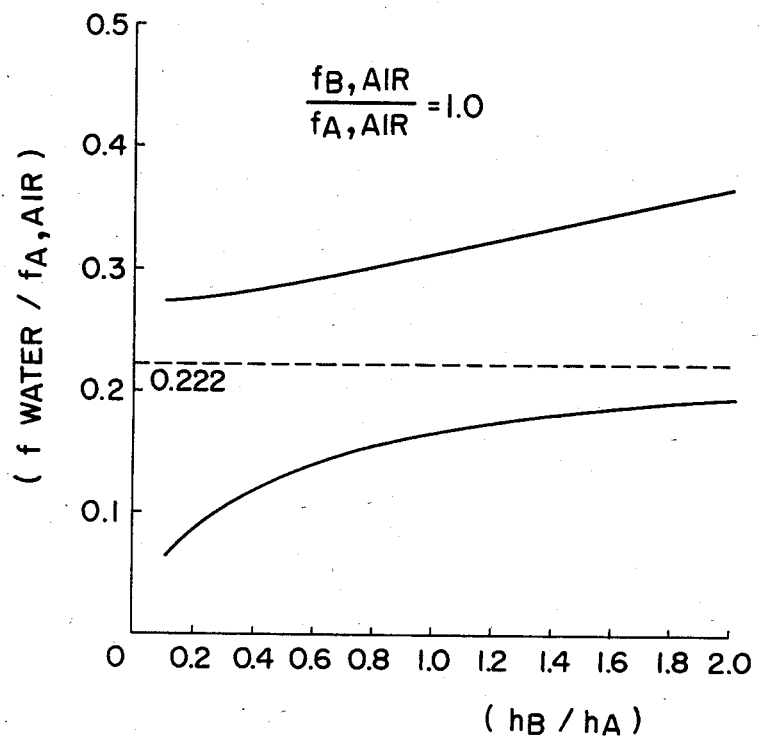

However, in the case of the model shown in FIG. 4 corresponding to a preferred embodiment of the present invention, two values as shown in FIGS. 5 and 6 are obtained from the equation (11) for a specific example of $h_A/r_0=0.05$, $Hc/r_0=0.1$, $Hd/r_0=He/r_0=0.05$, $\rho_A/\rho_B/\rho_0=7.86$ and n=2, wherein FIG. 5 illustrates the calculated results of the equation (11) under conditions wherein $h_A/h_B=1$ and $f_{Bair}/f_{Aair}$ is variable, while FIG. 6 illustrates the calculated result of the equation (11) under conditions wherein $f_{Bair}/f_{Aair}=1$ while $h_A/h_B$ is made variable.

As will be apparent from FIGS. 5 and 6, in the flow passage 10 shown in FIG. 4, wherein $Hc/r_0=Ha/r_0$ and $Hd/r_0=Hb/r_0$, the natural vibration frequency of the annular disc 11 in water can be controlled by varying either one of $h_B/h_A$ and $f_{Bair}/f_{Aair}$ without varying the size of the annular disc 11 itself.

Figure 7:
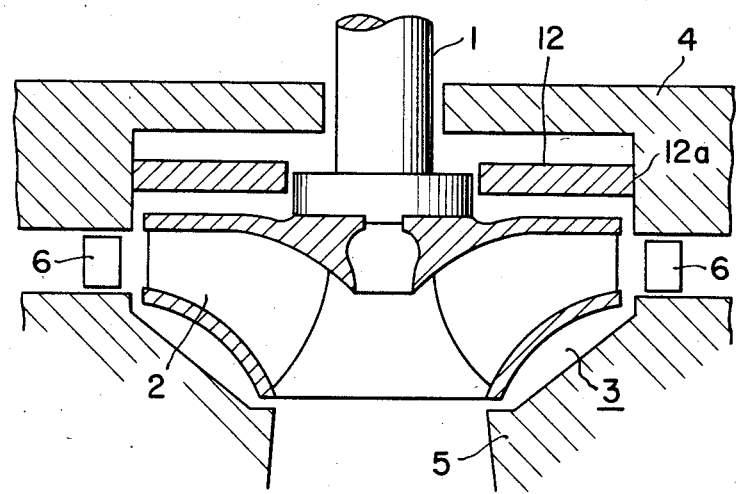
FIG. 7 is a longitudinal sectional view of a Francis type hydraulic turbine constituting a preferred embodiment of the invention.

FIG. 7 illustrates a preferred embodiment of the present invention wherein members similar to those shown in FIG. 1 are designated by similar reference numerals. In this embodiment based on the principle described above, a stationary vibration member 12 is provided in a back-pressure portion of the runner chamber 3, which is defined between the runner 2 and the upper cover 4. The vibration member 12 has an annular configuration, the outer peripheral edge 12a thereof being secured to an inner vertical surface of the upper cover 4. The runner 2 and the vibration member 12 are coupled with each other through water interposed therebetween so as to provide a resonance system wherein the natural vibration frequency of the vibration member 12 influences the natural vibration frequency of the runner 2. Accordingly, by suitably selecting the natural vibration frequency of the vibration member in air and/or effective thickness of the same, the natural vibration frequency of the runner in its operating state can be controlled as desired. Thus, the coincidence between the natural vibration frequency of the runner and the frequency of the hereinbefore described water pulsation can be avoided and the vibration withstanding capability of the runner can be substantially improved.

In the above described embodiment shown in FIG. 7, although the vibration member 12 is provided in the back-pressure portion of the runner chamber, it is apparent from the principle of this invention that the vibration member may be provided in the side-pressure portion of the runner chamber.

What is claimed is:
1. A hydraulic machine comprising:
a runner chamber having an upper cover and a lower cover;
a runner disposed within said runner chamber and having a defined axis of rotation; and
means, disposed within said runner chamber and disposed axially adjacent said runner, for controlling vibration of said runner
wherein said vibration and controlling means comprises a substantially annular disc, axially adjacent laterally coextensive with said runner, at least one of an axial thickness of said disc and a ratio $f_{Bair}/f_{Aair}$ being selected to control vibration of said runner, wherein $f_{Bair}$ is the natural vibration frequency of said annular disc in air, and $f_{Aair}$ is the natural vibration frequency of said vibration member in air.

2. A hydraulic machine as claimed in claim 1, wherein said vibration controlling means is secured to one of said upper cover and said lower cover.

* * * * *